United States Patent
Itamoto et al.

(10) Patent No.: US 8,981,690 B2
(45) Date of Patent: Mar. 17, 2015

(54) ELECTRIC POWER STEERING SYSTEM

(75) Inventors: Hidenori Itamoto, Tajimi (JP); Hirozumi Eki, Okazaki (JP); Gempei Nakasone, Nisshin (JP)

(73) Assignee: JTEKT Corporation, Osaka (JP)

( * ) Notice: Subject to any disclaimer, the term of this patent is extended or adjusted under 35 U.S.C. 154(b) by 88 days.

(21) Appl. No.: 13/602,617

(22) Filed: Sep. 4, 2012

(65) Prior Publication Data

US 2013/0063062 A1    Mar. 14, 2013

(30) Foreign Application Priority Data

Sep. 12, 2011  (JP) .................................. 2011-197805

(51) Int. Cl.
- *H02H 7/08* (2006.01)
- *H02P 6/00* (2006.01)
- *B62D 5/04* (2006.01)

(52) U.S. Cl.
CPC ............ *B62D 5/0487* (2013.01); *B62D 5/0484* (2013.01)
USPC .................. 318/400.21; 318/400.01; 180/446

(58) Field of Classification Search
CPC ........... H02H 7/093; H02P 6/14; H02P 6/001; H02P 6/08; H02P 6/182; H02P 29/021; G05B 19/00; G01R 31/025; B62D 5/0487
USPC ......................... 318/400.21, 400.01; 180/446
See application file for complete search history.

(56) References Cited

U.S. PATENT DOCUMENTS

| | | | |
|---|---|---|---|
| 2008/0203963 A1* | 8/2008 | Suzuki | 318/799 |
| 2009/0308683 A1* | 12/2009 | Suzuki | 180/446 |
| 2011/0074333 A1* | 3/2011 | Suzuki | 318/724 |
| 2011/0156626 A1* | 6/2011 | Mukai et al. | 318/400.21 |

FOREIGN PATENT DOCUMENTS

| | | | |
|---|---|---|---|
| DE | 10 2008 034326 A1 | 2/2009 | |
| EP | 1 961 642 A1 | 8/2008 | |

OTHER PUBLICATIONS

Sep. 23, 2013 Extended Search Report issued in European Patent Application No. 12183243.0.

* cited by examiner

*Primary Examiner* — Bentsu Ro
*Assistant Examiner* — Zemenay Truneh
(74) *Attorney, Agent, or Firm* — Oliff PLC

(57) ABSTRACT

An electric power steering system includes short-circuit determination means for determining whether a short-circuit between an energization failure phase and one of the two phases other than the energization failure phase has occurred while assist force is being generated using the two phases other than the energization failure phase as energization phases. When the short-circuit determination means determines that the short-circuit has occurred, generation of the assist force is stopped.

1 Claim, 13 Drawing Sheets

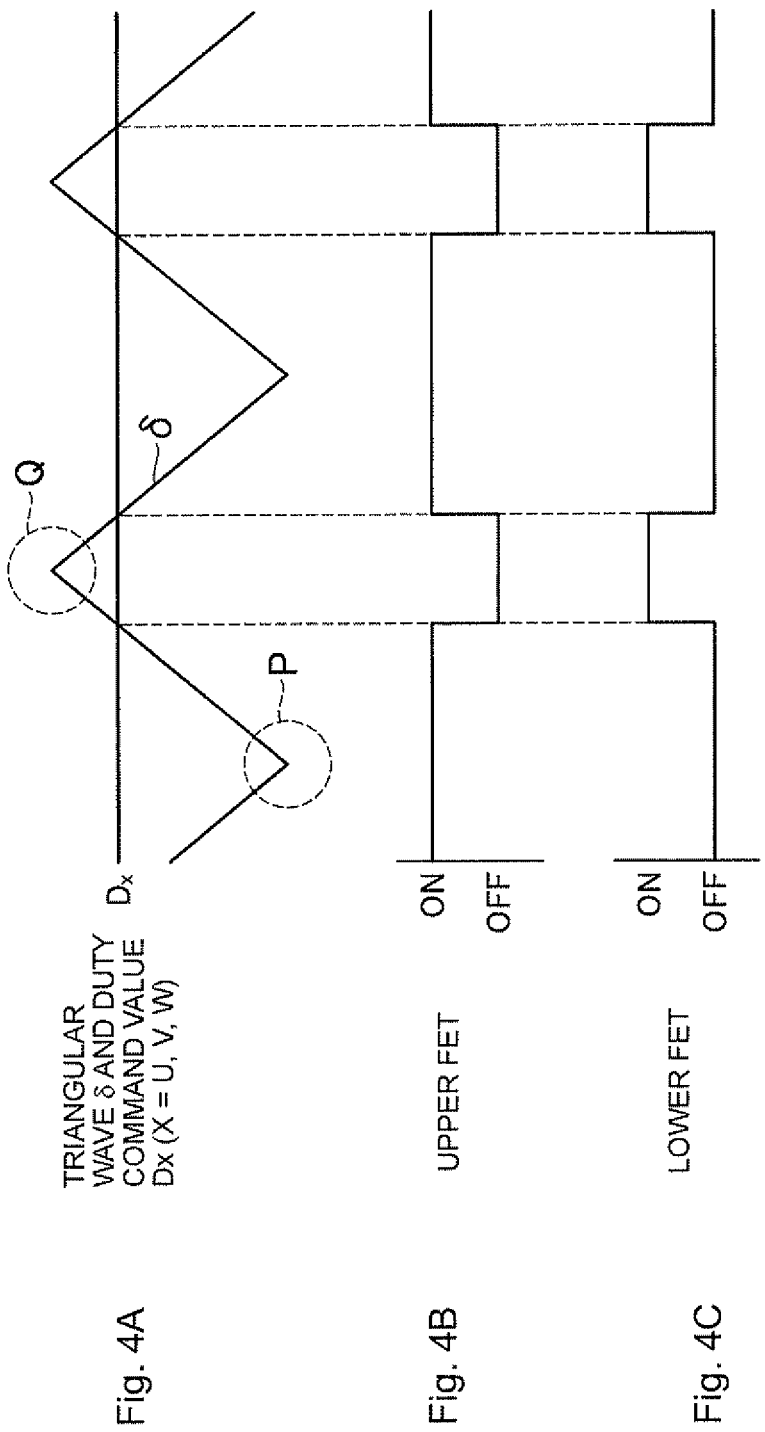

ELECTRIC POWER STEERING SYSTEM

INCORPORATION BY REFERENCE/RELATED APPLICATION

This application claims priority to Japanese Patent Application No. 2011-197805 filed on Sep. 12, 2011 the disclosure of which, including the specification, drawings and abstract, is incorporated herein by reference in its entirety.

BACKGROUND OF THE INVENTION

1. Field of the Invention

The invention relates to an electric power steering system.

2. Discussion of Background

Conventionally, most of motor control devices used in, for example, electric power steering systems (EPS) include malfunction detecting means for detecting occurrence of a malfunction when an energization failure occurs in one of a U-phase, a V-phase and a W-phase of a motor due to, for example, a break in a power supply line or a contact failure of a drive circuit. When occurrence of a malfunction is detected, generally, motor control is quickly stopped to provide failsafe protection.

In an EPS, however, the steering characteristics significantly change when the motor control is stopped as described above. That is, because assistance is no longer provided by the motor, larger steering operation force is required. US 2008/0203963 A1 describes an electric power steering system in which, even when a phase where an energization failure has occurred is detected as described above, motor control is continued with the use of the two phases other than the phase where the energization failure has occurred. In this way, it is possible to avoid an increase in a load on a driver caused by provision of the fail-safe protection, by continuing supply of assist force to a steering system.

However, in the electric power steering system in which the motor control is continued using the two phases, other than the phase where the energization failure has occurred, as energization phases, a short circuit between the phase where the energization failure has occurred and one of the other two phases may occur. If current flows through the short-circuited two phases, the motor may lock.

SUMMARY OF THE INVENTION

The invention provides an electric power steering system that reliably detects a malfunction and brings the system to a stop to secure safety.

According to a feature of an example of the invention, when it is determined that a short-circuit between an energization failure phase and one of two phases other than the energization failure phase has occurred while assist force is being generated using the two phases other than the energization failure phase as energization phases, generation of the assist force is stopped. As a result, it is possible to provide an electric power steering system that reliably detects a malfunction with a simple configuration and lock a motor to secure safety.

BRIEF DESCRIPTION OF THE DRAWINGS

The foregoing and further objects, features and advantages of the invention will become apparent from the following description of example embodiment with reference to the accompanying drawings, wherein like numerals are used to represent like elements and wherein:

FIG. 4A to FIG. 4C are timing charts that show a mode of PWM control and current detection during normal control according to the embodiment of the invention;

DETAILED DESCRIPTION OF EMBODIMENTS

Hereinafter, embodiments of the invention will be described with reference to the accompanying drawings.

Figure 1:
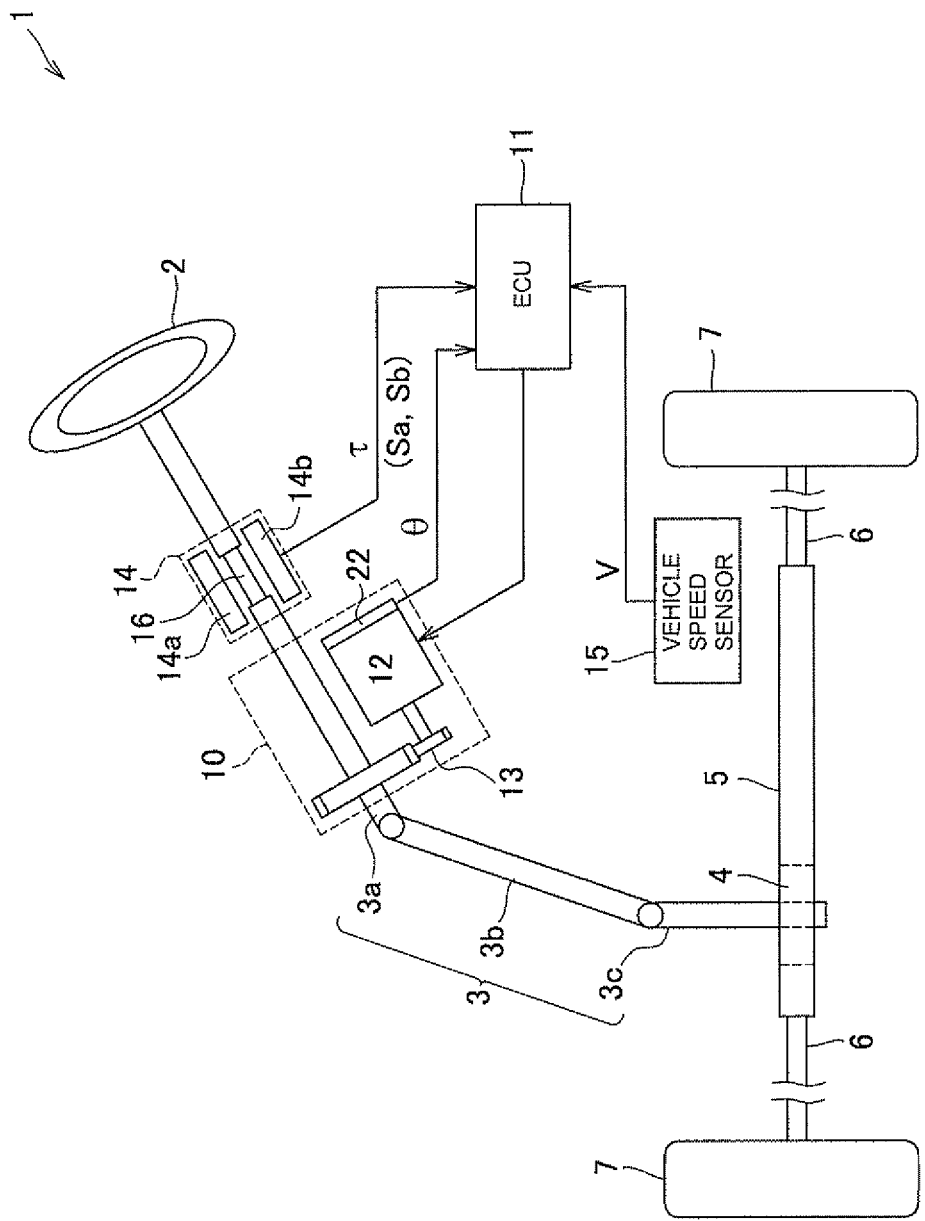
FIG. 1 is a view that illustrates the configuration of an electric power steering system according to an embodiment of the invention.

As shown in FIG. 1, in an electric power steering system (EPS) 1 according to an embodiment of the invention, a steering shaft 3 to which a steering wheel 2 is fixed is coupled to a rack shaft 5 via a rack-and-pinion mechanism 4, and the rotation of the steering shaft 3 resulting from a steering operation is converted into a reciprocal linear motion of the rack shaft 5 by the rack-and-pinion mechanism 4.

The steering shaft 3 according to the present embodiment is formed by coupling a column shaft 3a, an intermediate shaft 3b and a pinion shaft 3c together. The reciprocal linear motion of the rack shaft 5 resulting from the rotation of the steering shaft 3 is transmitted to knuckles (not shown) via tie rods 6 coupled to respective ends of the rack shaft 5. In this way, the steered angle of steered wheels 7, that is, the travelling direction of a vehicle, is changed.

In addition, the EPS 1 includes an EPS actuator 10 and an ECU 11 that are arranged in a steering system. The EPS actuator 10 applies assist force for a steering operation. The ECU 11 may function as control means for controlling the operation of the EPS actuator 10.

The EPS actuator 10 according to the present embodiment is configured as a so-called column-type EPS actuator in which a motor 12, which may function as a drive source, is drivably coupled to the column shaft 3a via a speed reduction mechanism 13. In the present embodiment, a brushless DC motor is employed as the motor 12. The EPS actuator 10 reduces the speed of rotation transmitted from the motor 12 and transmits the rotation with a reduced speed to the column shaft 3a. In this way, the EPS actuator 10 applies the motor torque to the steering system as assist force.

A torque sensor 14, a vehicle speed sensor 15 and a motor rotation angle sensor 22 are connected to the ECU 11. The ECU 11 detects a steering torque $\tau$, a vehicle speed V and a motor rotation angle $\theta$ on the basis of output signals from these sensors.

In the present embodiment, a torsion bar 16 is provided in the column shaft 3a. The torque sensor 14 in the present embodiment includes sensor elements 14a, 14b that output sensor signals Sa, Sb on the basis of twisting of the torsion bar 16. A steering torque $\tau$ transmitted via the steering shaft 3 is detectable from the sensor signals Sa, Sb.

It is possible to form such a torque sensor, for example, by arranging two magnetic sensing elements (Hall ICs in the present embodiment), as the sensor elements 14a, 14b, on the outer periphery of a sensor core (not shown) in which a magnetic flux changes on the basis of twisting of the torsion bar 16.

That is, as the torsion bar 16 is twisted by the torque input into the steering shaft 3, which is a rotary shaft, a magnetic flux that passes through the sensor elements 14a, 14b changes. The torque sensor 14 according to the present embodiment is configured to output the output voltages of the sensor elements 14a, 14b to the ECU 11 as the sensor signals Sa, Sb. The output voltages of the sensor elements 14a, 14b fluctuate in accordance with a change in magnetic flux.

Then, the ECU 11 computes a target assist force on the basis of the detected outputs, and controls driving electric power that is supplied to the motor 12, which is the drive source, in order to cause the EPS actuator 10 to generate a target assist force. In this way, the operation of the EPS actuator 10, that is, assist force that is applied to the steering system, is controlled.

Figure 2:
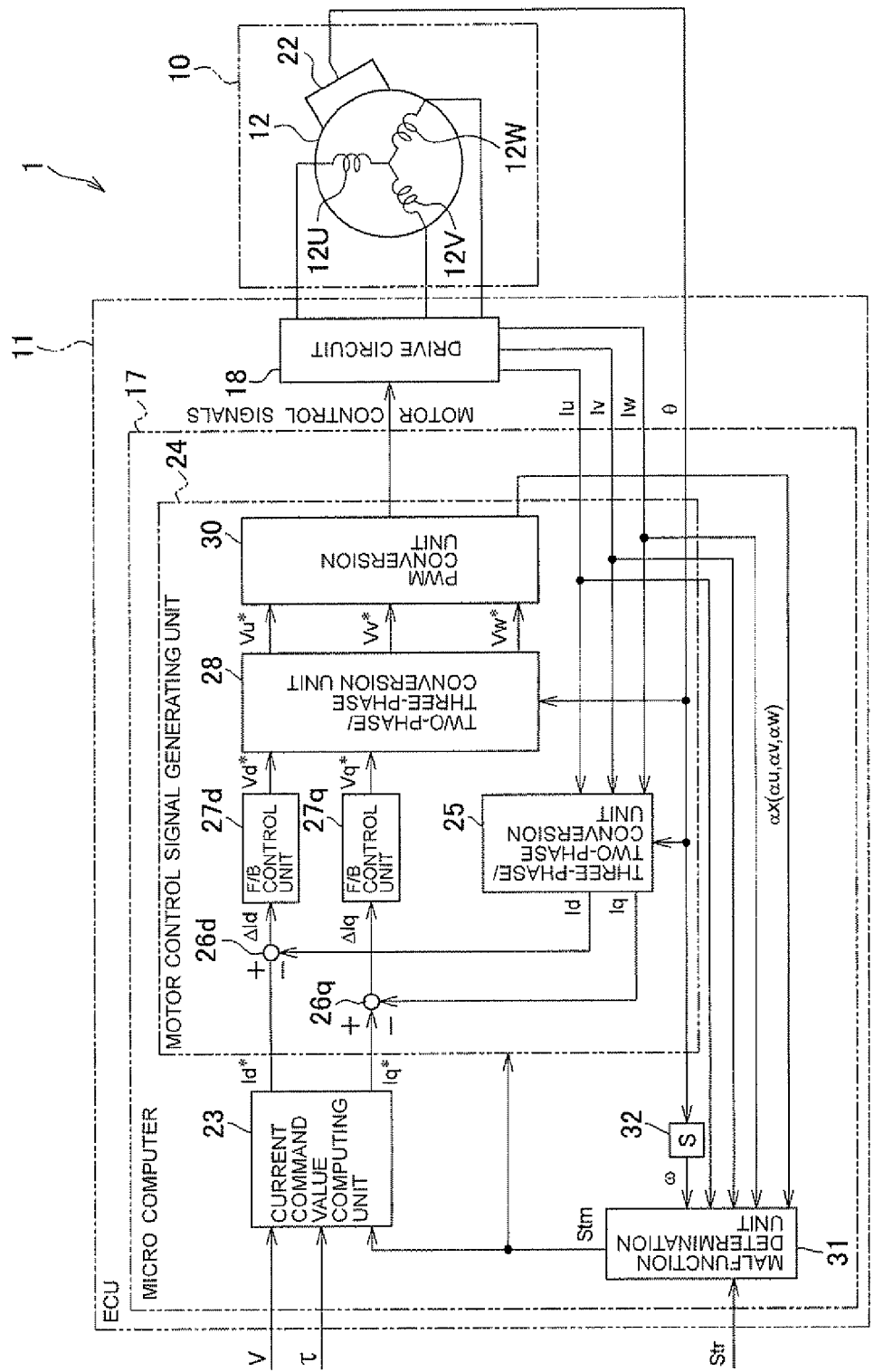
FIG. 2 is a block diagram that shows the electrical configuration of the electric power steering system according to the embodiment of the invention.

Next, assist control in the EPS according to the present embodiment will be described. As shown in FIG. 2, the ECU 11 includes a microcomputer 17 and a drive circuit 18. The microcomputer 17 outputs motor control signals. The drive circuit 18 supplies driving electric power to the motor 12, which serves as the drive source of the EPS actuator 10, on the basis of the motor control signals.

Figure 3:
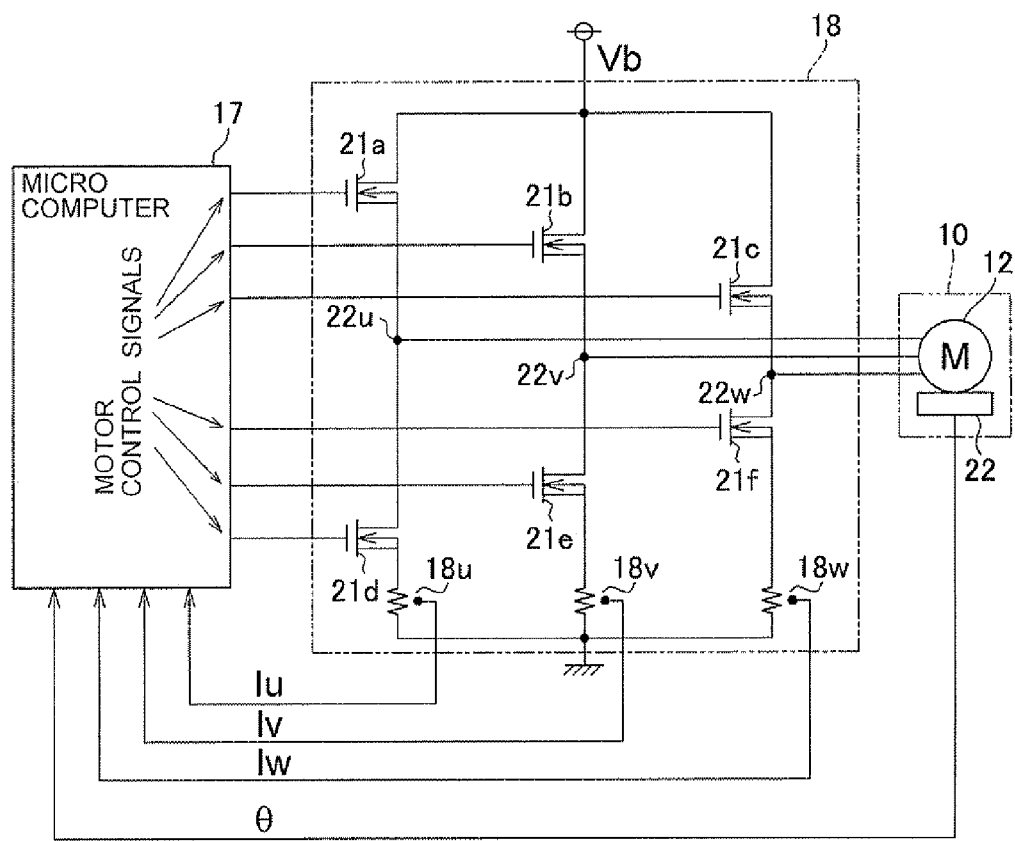
FIG. 3 is a detailed view that shows a drive circuit according to the embodiment of the invention.

First, the drive circuit 18 will be described with reference to FIG. 3. The drive circuit 18 according to the present embodiment is a known PWM inverter that is formed by connecting three arms corresponding to the respective phases in parallel, using a pair of serially connected switching elements as a base unit (arm). The motor control signals output from the microcomputer 17 define the on-duty ratios of the respective switching elements that constitute the drive circuit 18.

The motor control signals are input into the gate terminals of the switching elements, and the switching elements are turned on or off in response to the received motor control signals. Thus, the direct-current voltage of an in-vehicle power supply Vb is converted into three-phase (U, V, W) driving electric power, and the three-phase driving electric power is supplied to the motor 12.

More specifically, the drive circuit 18 is formed of a plurality of (2×3) power MOSFETs (hereinafter, referred to as "FETs"), the number of which corresponds to the number of phases of the motor 12. Specifically, the drive circuit 18 is formed by connecting a series circuit of FETs 21a, 21d, a series circuit of FETs 21b, 21e and a series circuit of FETs 21c, 21f in parallel.

A connection point 22u of the FETs 21a, 21d is connected to a U-phase coil of the motor 12, a connection point 22v of the FETs 21b, 21e is connected to a V-phase coil of the motor 12, and a connection point 22w of the FETs 21c, 21f is connected to a W-phase coil of the motor 12.

The motor control signals output from the microcomputer 17 are input into the gate terminals of the FET 21a to the FET 21f. The FET 21a to the FET 21f are turned on or off in response to the motor control signals. Thus, direct-current voltage supplied from the in-vehicle power supply Vb is converted into three-phase (U, V, W) driving electric power, and the three-phase driving electric power is supplied to the motor 12.

Further, the drive circuit 18 includes current sensors 18u, 18v, 18w that are used to detect phase current values Iu, Iv, Iw, which are values of currents that flow through the series circuit of the FETs 21a, 21d, the series circuit of the FETs 21b, 21e and the series circuit of the FETs 21c, 21f, respectively. The microcomputer 17 generates the motor control signals that are output to the drive circuit 18 on the basis of the phase current values Iu, Iv, Iw of the motor 12 and the motor rotation angle $\theta$ that are detected based on an output regarding the vehicle and the output signals from the current sensors 18u, 18v, 18w and motor rotation angle sensor 22.

Next, a method in which the phase current sensors 18u, 18v, 18w detect the phase current values Iu, Iv, Iw, respectively, will be described with reference to FIG. 4A to FIG. 4C. A motor control device according to the present embodiment executes motor control by executing known PWM control in which a triangular wave $\delta$ (see FIG. 4A) is used as a carrier wave. The phase current sensors 18u, 18v, 18w that are used to detect the phase current values Iu, Iv, Iw of the motor 12 are usually provided on the low potential side (ground side) of the switching arms (see FIG. 3). The phase current values Iu, Iv, Iw of the motor 12 are detected on the basis of output values from the phase current sensors 18u, 18v, 18w, which are periodically acquired at the timing based on the triangular wave $\delta$.

As shown in FIG. 4B and FIG. 4C, when a reference signal of each phase (duty command value Dx: x=U, V, W) is above the triangular wave $\delta$, the upper switching element in the switching arm of the phase is turned on, and the lower switching element in the switching arm of the phase is turned off. On the other hand, when a duty command value Dx of each phase is below the triangular wave $\delta$, the upper switching element in the switching arm of the phase is turned off, and the lower switching element in the switching arm of the phase is turned on.

As shown in FIG. 4A, the output value of each of the phase current sensors 18u, 18v, 18w is periodically acquired at timing P at which the triangular wave $\delta$ reaches its valley and at timing Q at which the triangular wave $\delta$ reaches its peak. With regard to each phase current value (Ix), the output value from each current sensor, which is acquired at the timing P at which the upper switching element in the phase switching arm is turned on, is acquired as an offset current value (Ixo). The output value (Ixr) from each current sensor, which is acquired at the timing Q at which the lower switching element is turned on, is acquired.

Each phase current value Ix used in a motor control signal generating unit 24 shown in FIG. 2 is calculated by subtracting the offset current value (Ixo) acquired at the timing P from the output value (Ixr) from each current sensor, which is acquired at the timing Q, (Ix=Ixr−Ixo). In the present embodiment, the offset current value (Ixo) detected at the timing P at which the triangular wave δ reaches its valley is referred to as "valley current value", and the current value (Ixr) detected at the timing Q at which the triangular wave δ reaches its peak is referred to as "peak current value".

Next, generation of the motor control signals by the microcomputer 17 will be described in detail with reference to FIG. 2. The microcomputer 17 includes a current command value computing unit 23 and the motor control signal generating unit 24. The current command value computing unit 23 serves as current command value computing means for computing assist force that is applied to the steering system, that is, a current command value as a control target value of motor torque. The motor control signal generating unit 24 serves as motor control signal generating means for generating a motor control signal on the basis of the current command value calculated by the current command value computing unit 23.

The current command value computing unit 23 computes a d-axis current command value Id* and a q-axis current command value Iq* on the basis of the steering torque τ detected by the torque sensor 14 and the vehicle speed V detected by the vehicle speed sensor 15, and outputs the d-axis current command value Id* and the q-axis current command value Iq* to the motor control signal generating unit 24.

The phase current values Iu, Iv, Iw detected by the current sensors 18u, 18v, 18w, respectively, and the motor rotation angle θ detected by the motor rotation angle sensor 24 are input into the motor control signal generating unit 24 together with these d-axis current command value Id* and q-axis current command value Iq* calculated by the current command value computing unit 23.

The motor control signal generating unit 24 generates motor control signals by executing current feedback control on a d-q coordinate system on the basis of the phase current values Iu, Iv, Iw and motor rotation angle θ.

That is, in the motor control signal generating unit 24, the phase current values Iu, Iv, Iw are input into a three-phase/two-phase conversion unit 25 together with the motor rotation angle θ, and are converted into a d-axis current value Id and a q-axis current value Iq in the d-q coordinate system by the three-phase/two-phase conversion unit 25. The q-axis current command value Iq* output from the current command value computing unit 23 is input into a subtracter 26q together with the q-axis current value Iq, and the d-axis current command value Id* is input into a subtracter 26d together with the d-axis current value Id.

Then, a d-axis current deviation gild and a q-axis current deviation ΔIq computed by the subtracter 26d and the subtracter 26q are input into a F/B control unit 27d and a F/B control unit 27q, respectively. The F/B control unit 27d executes feedback control for causing the d-axis current value Id, which is an actual current value, to follow the d-axis current command value Id* output from the current command value computing unit 23. The F/B control unit 27q executes feedback control for causing the q-axis current value Iq, which is an actual current value, to follow the q-axis current command value Iq* output from the current command value computing unit 23.

Specifically, the F/B control unit 27d computes a d-axis voltage command value Vd* by multiplying the received d-axis current deviation ΔId by a predetermined F/B gain (PI gain). The F/B control unit 27q computes a q-axis voltage command value Vq* by multiplying the received q-axis current deviation ΔIq by the predetermined F/B gain (PI gain). Then, the d-axis voltage command value Vd* and the q-axis voltage command value Vq* computed by the F/B control units 27d, 27q, respectively, are input into a two-phase/three-phase conversion unit 28 together with the motor rotation angle θ, and are converted into three-phase voltage command values Vu*, Vv*, Vw* by the two-phase/three-phase conversion unit 28.

The voltage command values Vu*, Vv*, Vw* computed by the two-phase/three-phase conversion unit 28 are input into a PWM conversion unit 30, and duty command values αu, αv, αw corresponding to the voltage command values Vu*, Vv*, Vw* are generated by the PWM conversion unit 30.

Then, the motor control signal generating unit 24 generates motor control signals having on-duty ratios indicated by the duty command values αu, αv, αw, and the microcomputer 17 outputs the motor control signals to (the gate terminals of) the switching elements that constitute the drive circuit 18. In this way, the operation of the drive circuit 18, that is, supply of driving electric power to the motor 12, is controlled.

Next, a control mode in the ECU according to the present embodiment at the time of occurrence of a malfunction will be described. As shown in FIG. 2, in the ECU 11 according to the present embodiment, the microcomputer 17 includes a malfunction determination unit 31 that is used to identify the type of a malfunction when the malfunction occurs in the EPS 1. The microcomputer 17 changes the control mode of the motor 12 on the basis of the type of the malfunction, which is identified by the malfunction determination unit 31.

More specifically, a malfunction signal Str used to detect a malfunction of the mechanical configuration of the EPS actuator 10 is input into the malfunction determination unit 31, and the malfunction determination unit 31 detects a malfunction of a mechanical system in the EPS 1 on the basis of the received malfunction signal Str. In addition, the phase current values Iu, Iv, Iw of the motor 12, the motor rotation angular velocity ω, the phase duty command values αu, αy, αw, and the like, are input into the malfunction determination unit 31. The motor rotation angular velocity ω is obtained by differentiating the motor rotation angle θ with the user of a differentiator 32.

On the basis of these outputs, the malfunction determination unit 31 detects a malfunction of the torque sensor 14 and a malfunction in a power supply system for supplying electric power to the motor 12, more specifically, occurrence of a phase where energization failure (hereinafter, referred to as "energization failure phase") has occurred, or the like, due to occurrence of an overcurrent, a break in a power line (including a motor coil), a contact failure of the drive circuit 18, or the like.

For example, detection of occurrence of an energization failure phase is made as follows. When the X-phase (X=U, V, W) phase current value Ix is smaller than or equal to a phase current predetermined value Ith (|Ix|≤Ith) and the motor rotation angular velocity ω falls within a break determination target range (|ω|≤ω0), it is determined whether the state where the duty command value αx corresponding to the phase is not within a range from a predetermined value (αLo) near the lower limit value to a predetermined value (αHi) near the upper limit value (αLo≤αx≤αHi) is continued.

In this case, the phase current predetermined value Ith that is used as the threshold of the phase current value Ix is set to a value near "0", and the predetermined value ω0 of the motor rotation angular velocity is set to a value lower than a value corresponding to a base speed (maximum rotational speed) of the motor. The duty command value thresholds (αLo, αHi)

related to the duty command value αx are set to a value larger than the lower limit value of the duty command value αx and a value smaller than the upper limit value of the duty command value αx in normal control.

Furthermore, in the present embodiment, the microcomputer 17 changes the control mode of the motor 12 on the basis of the result of malfunction determination made by the malfunction determination unit 31. Specifically, the malfunction determination unit 31 outputs the result of malfunction determination, including the result of the above-described energization failure detection, as a malfunction detection signal Stm, and the motor control signal generating unit 24 generates motor control signals on the basis of the input malfunction detection signal Stm. In this way, the control mode of the motor 12 in the microcomputer 17 is changed.

More specifically, the microcomputer 17 according to the present embodiment mainly has three control modes, that is, a "normal control mode", an "assist stop mode" and a "two-phase drive mode". The "normal control mode" is a control mode selected at normal times. The "assist stop mode" is a control mode selected when a malfunction has occurred and the motor 12 should be stopped. The "two-phase drive mode" is a control mode selected when an energization failure has occurred in one of the phases of the motor 12.

When the malfunction detection signal Stm output from the malfunction determination unit 31 corresponds to the "normal control mode", the current command value computing unit 23 computes a d-axis current command value Id* and a q-axis current command value Iq* and the motor control signal generating unit 24 generates motor control signals for normal times as described above.

On the other hand, when the malfunction detection signal Stm output from the malfunction determination unit 31 is the "assist stop mode", the current command value computing unit 23 computes a d-axis current command value Id* and a q-axis current command value Iq* and the motor control signal generating unit 24 generates motor control signals such that driving of the motor 12 is stopped.

The "assist stop mode" is selected not only when a malfunction has occurred in the mechanical system or a malfunction has occurred in the torque sensor 14 but also when a malfunction, for example, an overcurrent has occurred in the power supply system.

The "assist stop mode" includes not only a mode where driving of the motor 12 is immediately stopped but also a mode where the output of the motor 12 is gradually reduced, that is, assist force is gradually reduced and finally stopped. In the latter mode, the current command value computing unit 23 gradually reduces (the absolute value of) the q-axis current command value Iq* to be output. After the motor 12 is stopped, the microcomputer 17 opens the switching elements that constitute the drive circuit 18 and opens power supply relays (not shown).

The malfunction detection signal Stm corresponding to the "two-phase drive mode" contains information for identifying an energization failure phase. When the malfunction detection signal Stm output from the malfunction determination unit 31 corresponds to the "two-phase drive mode", the motor control signal generating unit 24 generates motor control signals by which two phases other than the energization failure phase are set as energization phases.

Figure 5A:
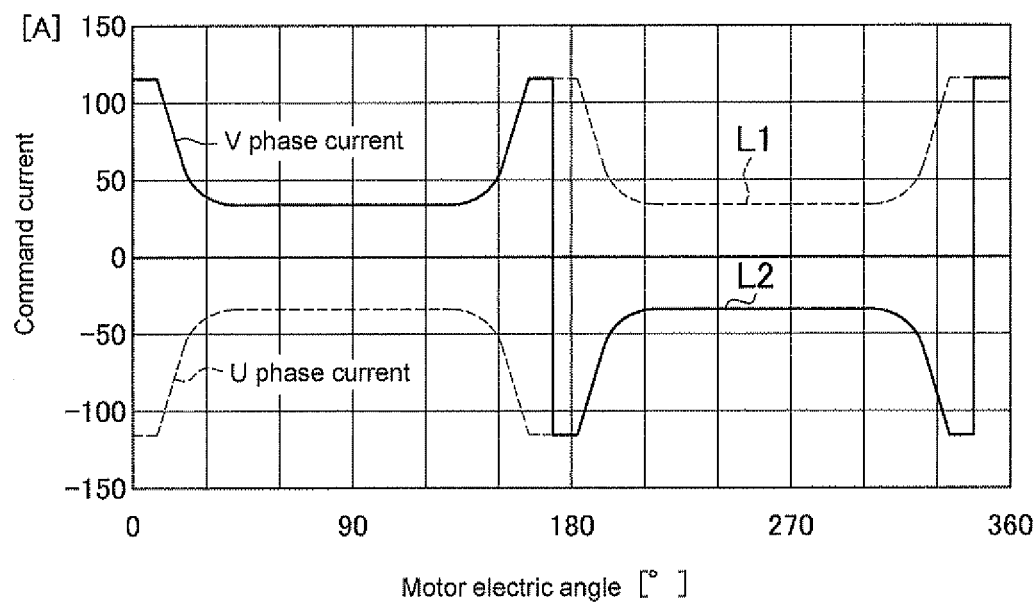
FIG. 5A shows waveforms of currents of two phases other than a phase where an energization failure has occurred during normal two-phase driving according to the embodiment of the invention.

Next, the "two-phase drive mode" will be described with reference to FIG. 5A and FIG. 5B. In FIG. 5A, the abscissa axis represents an electrical angle (°) of the motor 12, and the ordinate axis represents a current command value (A), which indicates the value of current that is passed through the two phases other than the energization failure phase. The broken line and the continuous line indicate two-phase drive control current waveforms of a U-phase current (L1) and a V-phase current (L2), respectively (W-phase is the energization failure phase). The W-phase is the energization failure phase. In order to obtain the two-phase drive control current waveforms of the U-phase current and the V-phase current, other than the energization failure phase, it is necessary to execute computation, $Ix=Iq^*/(\sqrt{2} \times \cos \theta)$ in the current command value computing unit 23 shown in FIG. 2.

Figure 5B:
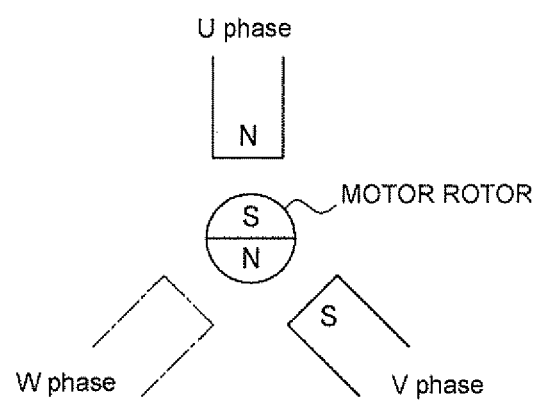
FIG. 5B is a conceptual view of magnetic fields in a two-phase driving state.

FIG. 5B shows a conceptual view of magnetic fields that occur in the motor 12 when the W-phase is the energization failure phase and the motor 12 is driven by the two-phase currents other than the W-phase current, that is, the U-phase current and the V-phase current. The W-phase that is the energization failure phase does not form a magnetic pole. Magnetic poles are formed by the two-phase currents other than the W-phase current, that is, the U-phase current and V-phase current to attract a rotor of the motor 12, thus causing the rotation of rotor.

Furthermore, in the present embodiment, the microcomputer 17 includes short-circuit determination means (included in the malfunction determination unit 31) for detecting a short-circuit when a short-circuit between the energization failure phase and one of the other two phases occurs after the "two-phase drive mode" is selected at the time of selection of the control mode. When a short-circuit between the energization failure phase and one of the other two phases occurs and a current having a current value I0 larger than a predetermined value (for example, 10 A) flows through the short-circuited two phases, the motor may lock. Therefore, the control mode is changed from the "two-phase drive mode" to the "assist stop mode", and application of assist force to the steering system is stopped.

Figure 6A:
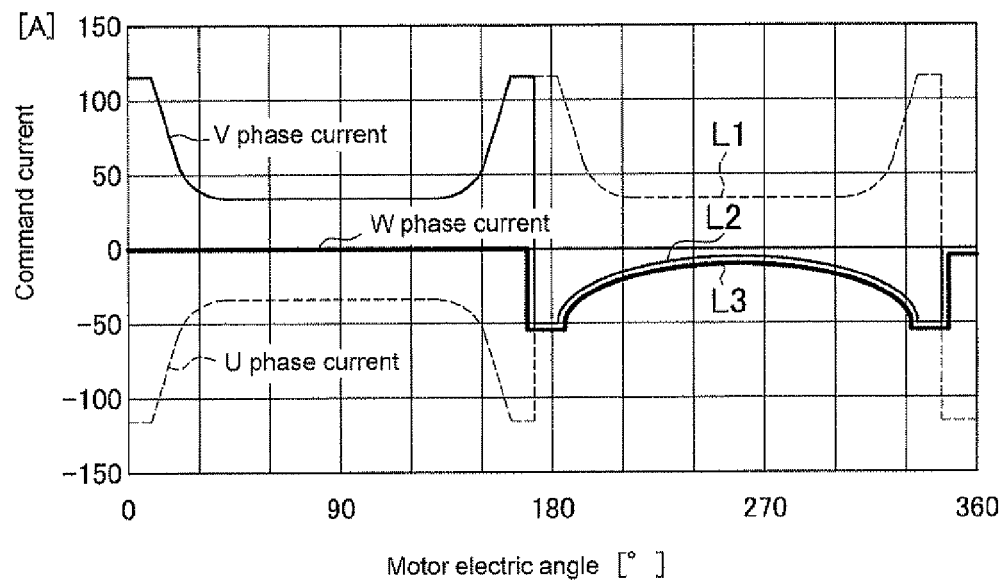
FIG. 6A shows three-phase current waveforms at the time of a short-circuit between a phase where an energization failure has occurred and one of the other two phases according to the embodiment of the invention.

In FIG. 6A as well as in FIG. 5A, the broken line and the narrow continuous line indicate two-phase drive control current waveforms of the U-phase current (L1) and the V-phase current (L2), respectively. However, a W-phase current (L3) indicated by the wide continuous line flows through the W-phase. At normal times, current does not flow through the W-phase, because the W-phase is the energization failure phase. Note that, in the present embodiment, description is provided on a case where a short-circuit between the W-phase, which is the energization failure phase, and the V-phase, which is one of the other phases, occurs.

Figure 6B:
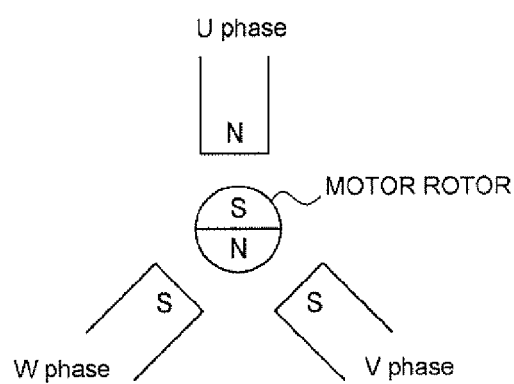
FIG. 6B is a conceptual view of magnetic fields in a motor electromagnetically locked state.

As shown in FIG. 6A, within a motor electrical angle range between 0° and 180°, the W-phase current does not flow; whereas, between a motor electrical angle range between 180° and 360°, the V-phase current and the W-phase current flow while being superimposed on each other with respect to the U-phase current. FIG. 6B shows a conceptual view of magnetic fields that occur in the motor in a three-phase drive control state where a short-circuit between the W-phase, which is the energization failure phase, and the V-phase, which is one of other phases, occurs. Because the W-phase that is the energization failure phase is also energized, so a magnetic pole is formed in the W-phase. Because the rotational force produced by the U-phase current and the rotational force produced by the V-phase current and W-phase current are balanced out, the motor is locked.

As described above, if the motor is locked, dangers may be caused, for example, when a sudden steering is required. Therefore, the system should be immediately stopped. In the present embodiment, even when one of the three phases becomes the energization failure phase, it is possible to continue assist control using the two phases other than the energization failure phase. However, when a short-circuit between the energization failure phase and one of the other two phases occurs, the motor is locked. Therefore, the state where the motor is locked is accurately detected, and the system is reliably stopped. In this way, the electric power steering system that is able to ensure safety is obtained.

Figure 7:
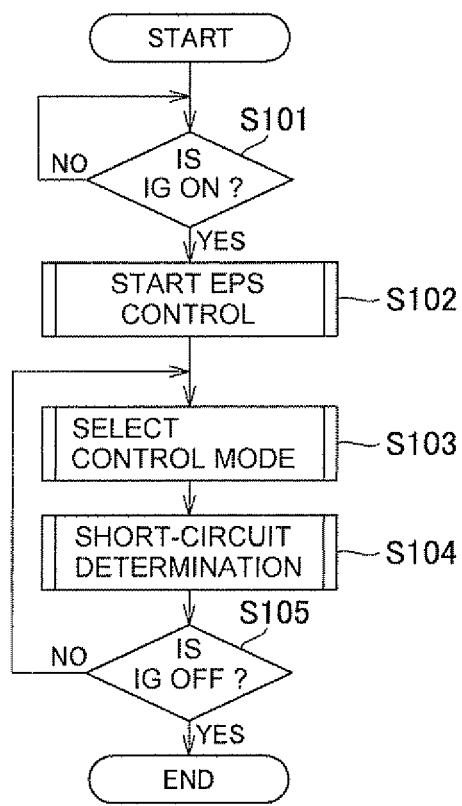
FIG. 7 is a flowchart that shows the main procedure of EPS control according to the embodiment of the invention.

Next, the procedure of a main routine of EPS control executed by the microcomputer 17 according to the present embodiment will be described with reference to the flowchart shown in FIG. 7. The microcomputer 17 determines whether an ignition switch (IG) is on (step S101). When the IG is on (YES in step S101), the process proceeds to step S102. On the other hand, when the IG is not on (NO in step S101), the process returns to step S101, and this process is repeated until the IG is turned on.

Subsequently, in step S102, EPS control is started. Then, the process proceeds to step S103. In step S103, energization failure determination is executed on each phase of the motor, and then the control mode is selected. After the control mode is selected, the process proceeds to step S104, and short-circuit determination is executed. After short-circuit determination is executed, the process proceeds to step S105, and it is determined whether the IG is off. When the IG is off (YES in step S105), the process ends. In addition, when the IG is not off (NO in step S105), the process returns to step S103, and step S103 to step S105 are repeated.

Figure 8:
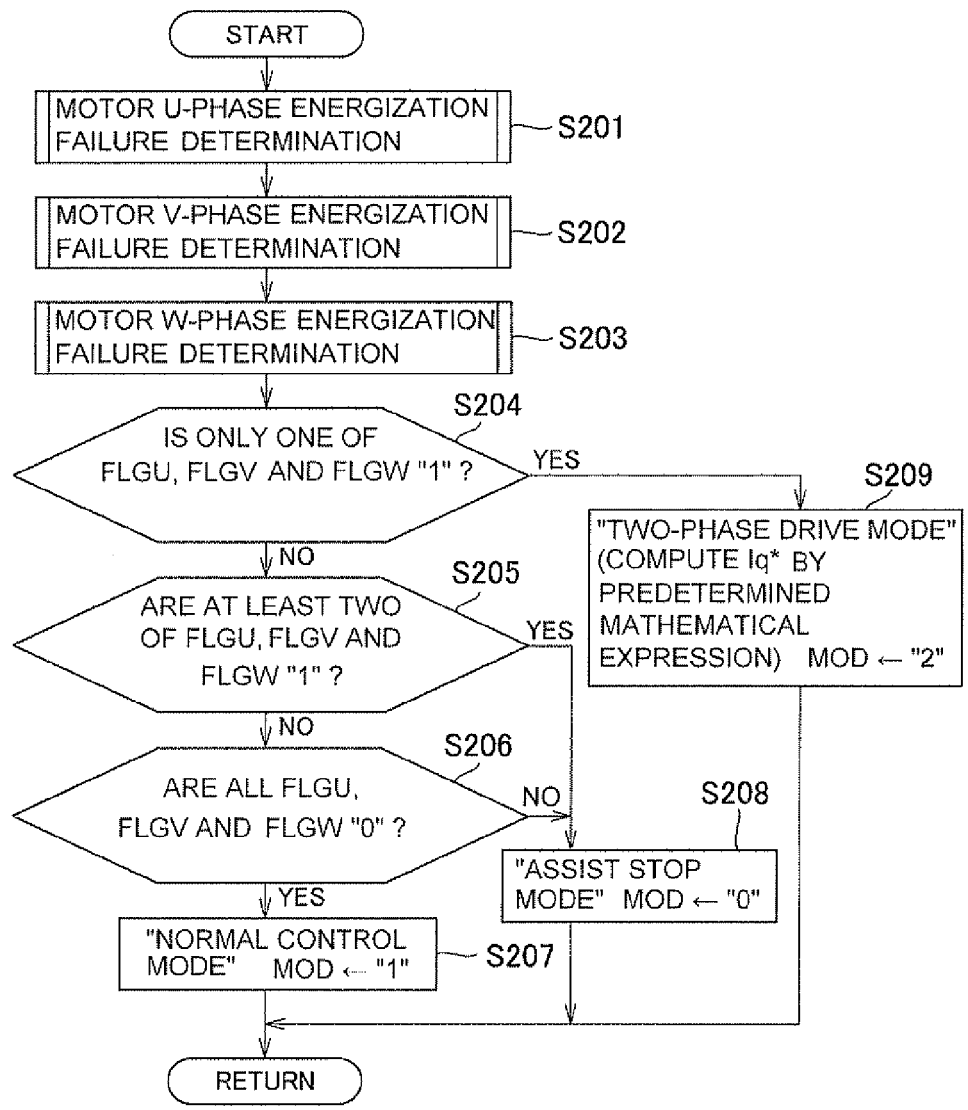
FIG. 8 is a flowchart that shows the procedure of motor X-phase energization failure determination and control mode selection according to the embodiment of the invention.

Next, the procedure of a motor X-phase energization failure determination and control mode selection sub-routine, which is executed by the microcomputer 17 according to the present embodiment, will be described with reference to the flowchart shown in FIG. 8. The microcomputer 17 executes motor U-phase energization failure determination (step S201). Subsequently, the microcomputer 17 executes motor V-phase energization failure determination (step S202). Furthermore, the microcomputer 17 executes motor W-phase energization failure determination (step S203).

In energization failure determination on each phase, if there is an energization failure, a motor X-phase energization failure flag FLUX (X=U, V, W) is set to "1". For example, when the U-phase of the motor is an energization failure phase, the motor U-phase energization failure flag FLGU is set to "1"; whereas, when the U-phase of the motor is not an energization failure phase, FLGU is set to "0".

Subsequently, the microcomputer 17 determines whether only one of the FLGXs (X=U, V, W) is "1" (step S204). When a determination that only one of the FLGXs (X=U, V, W) is "1" is not made (NO in step S204), the microcomputer 17 determines whether at least two of the FLGXs (X=U, V, W) are "1" (step S205).

When a determination that at least two of the FLGXs (X=U, V, W) are "1" is not made (NO in step S205), the microcomputer 17 determines whether all the FLGXs (X=U, V, W) are "0" (step S206). When all the FLGXs (X=U, V, W) are "0" (YES in step S206), the "normal control mode" is selected, a control mode flag MOD is set to "1" (step S207), and the process is ended.

On the other hand, when not all the FLGXs (X=U, V, W) are "0" (NO in step S206), the microcomputer 17 determines that energization failure flag determination is abnormal and selects the "assist stop mode", sets the control mode flag MOD to "0" (step S208), and ends the process. In addition, when at least two of the FLGXs (X=U, V, W) are "1" (YES in step S205), the microcomputer 17 selects the "assist stop mode", sets the control mode flag MOD to "0" (step S208), and ends the process.

Furthermore, when only one of the FLGXs (X=U, V, W) is "1" (YES in step S204), the microcomputer 17 selects the "two-phase drive mode (Iq* is computed by a predetermined mathematical expression)", sets the control mode flag MOD to "2" (step S209), and ends the process.

Figure 9:
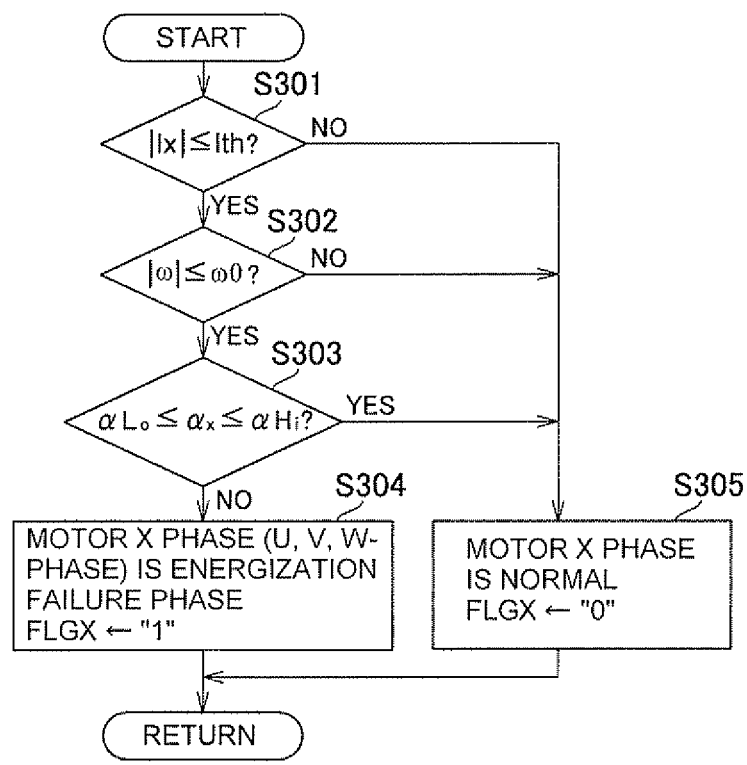
FIG. 9 is a flowchart that shows the procedure of motor X-phase energization failure detection according to the embodiment of the invention.

Next, the process of motor X-phase energization failure determination, which is executed by the microcomputer 17 according to the present embodiment, will be described with reference to the flowchart shown in FIG. 9. The microcomputer 17 determines whether the absolute value of the detected phase current value Ix is smaller than or equal to the predetermined value Ith (step S301). When the absolute value of the detected phase current value Ix is smaller than or equal to the phase current predetermined value Ith ($|Ix| \leq Ith$, YES in step S301), the microcomputer 17 subsequently determines whether the absolute value of the motor rotation angular velocity ω is lower than or equal to the predetermined motor rotation angular velocity ω0 (step S302).

When the absolute value of the motor rotation angular velocity ω is lower than or equal to the predetermined motor rotation angular velocity ω0 ($|\omega| \leq \omega0$, YES in step S302), the microcomputer 17 determines whether the duty command value αx falls within the above-described predetermined range ($\alpha Lo \leq \alpha x \leq \alpha Hi$) (step S303). When the duty command value αx does not fall within the above-described predetermined range (NO in step S303), the microcomputer 17 determines that an energization failure has occurred in the X phase of the motor, sets the motor X-phase energization failure flag FLGX to "1" (X-phase energization failure, FLGX="1", step S304), and ends the process.

When the absolute value of the detected phase current value Ix is larger than the phase current predetermined value Ith ($|Ix| > Ith$, NO in step S301), when the absolute value of the motor rotation angular velocity ω is higher than the predetermined motor rotation angular velocity ω0 ($|\omega| > \omega0$, NO in step S302) or when the duty command value αx falls within the above-described predetermined range ($\alpha Lo \leq \alpha x \leq \alpha Hi$, YES in step S303), the microcomputer 17 determines that no energization failure has occurred in the X phase of the motor, sets the motor X-phase energization failure flag FLUX to "0" (X phase is normal, FLUX="0", step S305), and ends the process.

Figure 10:
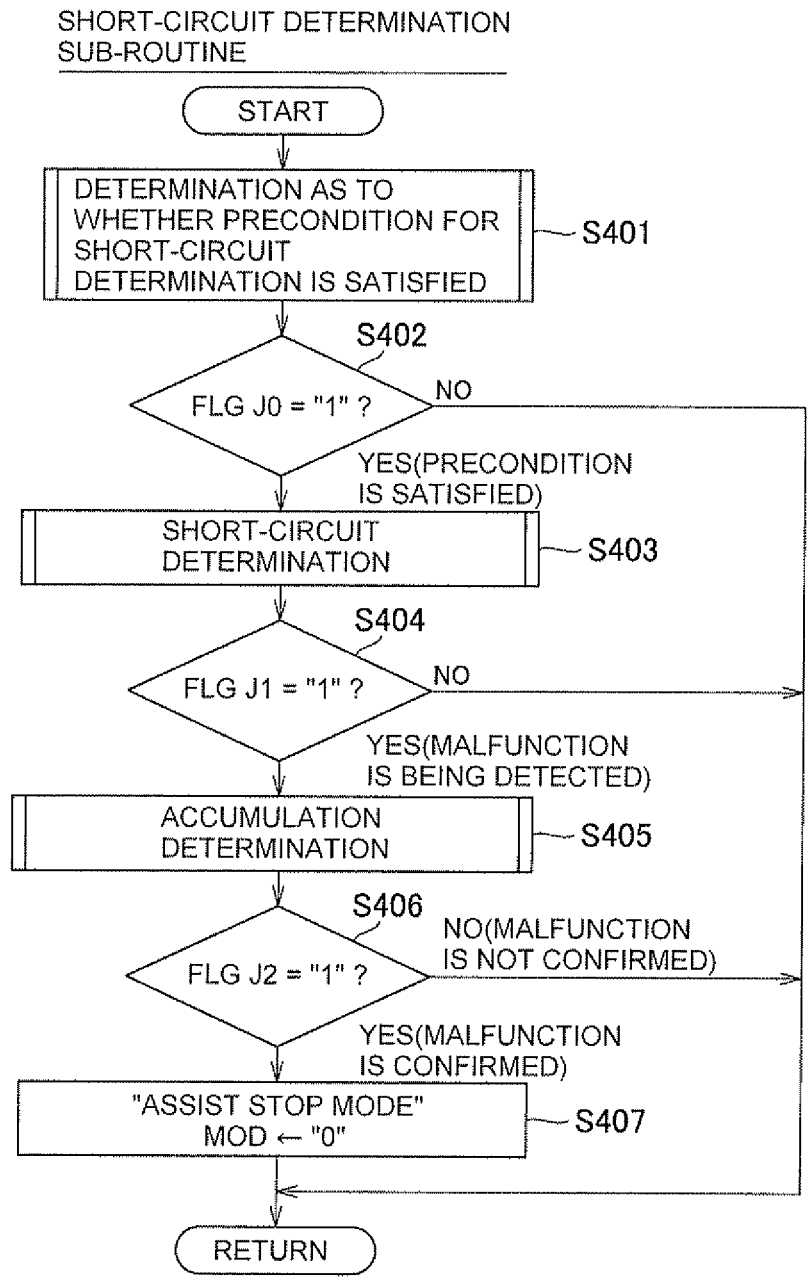
FIG. 10 is a flowchart that shows the procedure of short-circuit determination according to the embodiment of the invention.

Next, the procedure of short-circuit determination executed by the microcomputer 17 according to the present embodiment will be described with reference to the flowchart shown in FIG. 10. The microcomputer 17 determines whether a precondition for short-circuit determination is satisfied (step S401). Then, the microcomputer 17 determines whether a precondition determination flag FLGJ0 for short-circuit determination is "1" (whether FLGJ0="1", step S402).

When the precondition determination flag FLGJ0 for short-circuit determination is "1" (FLGJ0="1", YES in step S402), the microcomputer 17 determines that the precondition for short-circuit determination is satisfied, and executes short-circuit determination (step S403).

Subsequently, the microcomputer 17 determines whether a short-circuit detection flag FLGJ1 is "1" (during malfunction detection) (whether FLGJ1="1", step S404). When the short-circuit detection flag FLGJ1 is "1" (FLGJ1="1", YES in step S404), the microcomputer 17 determines that short-circuit determination is being executed and executes accumulation determination (step S405).

Subsequently, the microcomputer 17 determines whether a short-circuit confirmation flag FLGJ2 is "1" (malfunction confirmation) (whether FLGJ2="1", step S406). When the short-circuit confirmation flag FLGJ2 is "1" (FLGJ2="1", YES in step S406), the microcomputer 17 determines that short-circuit is confirmed, selects the "assist stop mode", sets the control mode flag MOD to "0" (step S407), and ends the process.

Furthermore, when the precondition determination flag FLGJ0 for short-circuit determination is not "1" (FLGJ0="0", NO in step S402), when the short-circuit detection flag FLGJ1 is not "1" (FLGJ1="0", NO in step S404) or when the short-circuit confirmation flag FLGJ2 is not "1" (FLGJ2="0", NO in step S406), the microcomputer 17 directly ends the process.

Figure 11:
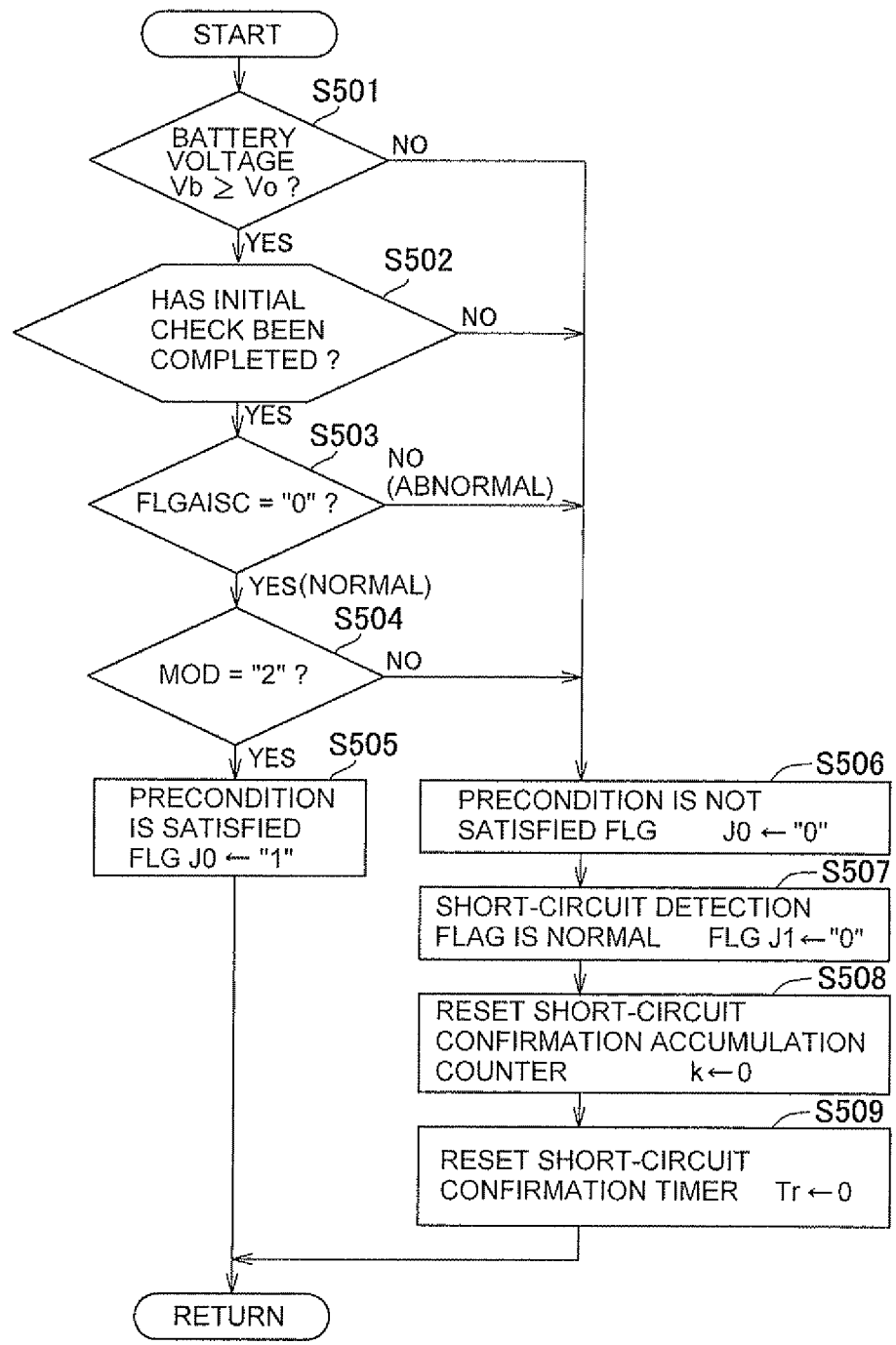
FIG. 11 is a flowchart that shows the procedure for determining whether a precondition for short-circuit determination is satisfied according to the embodiment of the invention.

Next, the procedure of determining whether the precondition for short-circuit determination is satisfied, which is executed by the microcomputer 17 according to the present embodiment, will be described with reference to the flowchart shown in FIG. 11. The microcomputer 17 determines whether the battery voltage Vb is higher than or equal to a predetermined voltage V0 (for example, 7.5 V) (whether Vb≥V0, step S501). When the battery voltage Vb is higher than or equal to the predetermined voltage V0 (Vb≥V0, YES in step S501), the microcomputer 17 determines whether initial check has been normally completed (step S502). When initial check has been normally completed (YES in step S502), the microcomputer 17 proceeds to step S503. The fact that initial check is normal indicates that all internal storage areas (ROM, RAM) of the microcomputer 17 have been checked when the power of the microcomputer 17 is turned on and, as a result, all the internal storage areas are normal.

The microcomputer 17 determines whether a flag FLGAISC that indicates a malfunction of semiconductors is "0" (whether FLGAISC="0", step S503). When the flag FLGAISC that indicates a malfunction of semiconductors is "0" (FLGAISC="0", YES in step S503), the microcomputer 17 determines whether the control mode flag MOD is "2" ("two-phase drive mode (Iq* is computed by the predetermined mathematical expression)") (whether MOD="2", step S504).

When the control mode flag MOD is "2" (MOD="2", YES in step S504), the microcomputer 17 sets the precondition determination flag FLGJ0 for short-circuit determination to "1" (FLGJ0="1", step S505), and ends the process.

On the other hand, when the battery voltage Vb is lower than the predetermined voltage V0 (Vb<V0, NO in step S501), when the initial check has not been normally completed (NO in step S502), when the flag FLGAISC that indicates a malfunction of semiconductors is "1" (FLGAISC="1", NO in step S503) or when the control mode flag MOD is not "2" (NO in step S504), the microcomputer 17 determines that the precondition for short-circuit determination is not satisfied and sets the precondition determination flag FLGJ0 for short-circuit determination to "0" (FLGJ0="0", step S506).

The microcomputer 17 sets the short-circuit detection flag FLGJ1 to "0" (step S507), and resets a short-circuit confirmation accumulation counter k (k=0, step S508). Then, the microcomputer 17 also resets a short-circuit confirmation timer Tr (Tr=0, step S509), and ends the process.

Figure 12:
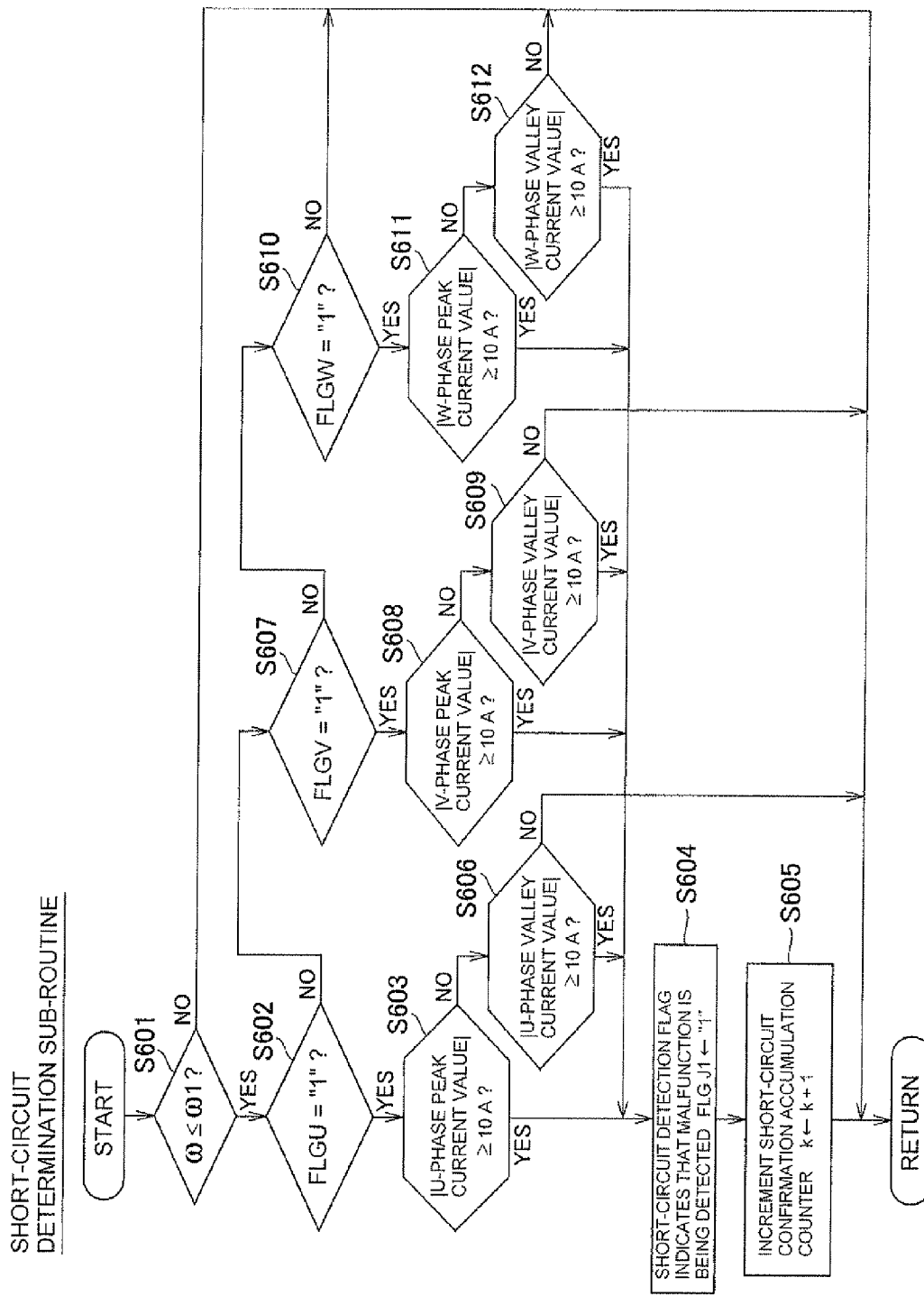
FIG. 12 is a flowchart that shows the procedure of short-circuit determination according to the embodiment of the invention.

Next, the procedure of short-circuit determination executed by the microcomputer 17 according to the present embodiment will be described with reference to the flowchart shown in FIG. 12. The microcomputer 17 determines whether the motor rotation angular velocity ω is lower than or equal to a predetermined motor rotation angular velocity ω1 (for example, 500 rpm) (whether ω≤ω1, step S601). When the motor rotation angular velocity ω is lower than or equal to the predetermined motor rotation angular velocity ω1 (ω≤ω1, YES in step S601), the microcomputer 17 determines whether the motor U-phase energization failure flag FLGU is "1" (step S602).

When the motor U-phase energization failure flag FLGU is "1" (FLGU="1", YES in step S602), the microcomputer 17 determines whether the absolute value of the U-phase peak current value (|Iuu|) is larger than or equal to a predetermined current value I0 (for example, 10 A) (whether |Iuu|≥I0, step S603).

When the absolute value of the U-phase peak current value (|Iuu|) is larger than or equal to the predetermined current value I0 (|Iuu|≥I0, YES in step S603), the microcomputer 17 sets the short-circuit detection flag FLGJ1 to "1" (step S604). Then, the microcomputer 17 increments the short-circuit confirmation accumulation counter k (k=k+1, step S605), and ends the process.

On the other hand, when the absolute value of the U-phase peak current value (|Iuu|) is smaller than the predetermined current value I0 (|Iuu|<I0, NO in step S603), the microcomputer 17 determines whether the absolute value of the U-phase valley current value (|Iu1|) is larger than or equal to the predetermined current value I0 (whether |Iu1|≥I0, step S606).

When the absolute value of the U-phase valley current value (|Iu1|) is larger than or equal to the predetermined current value I0 (|Iu1|≥I0, YES in step S606), the microcomputer 17 proceeds to step S604. When the absolute value of the U-phase valley current value (|Iu1|) is smaller than the predetermined current value I0 (|Iu1|<I0, NO in step S606), the microcomputer 17 ends the process.

Furthermore, when the motor U-phase energization failure flag FLGU is not "1" (FLGU="0", NO in step S602), the microcomputer 17 determines whether the motor V-phase energization failure flag FLGV is "1" (step S607). When the motor V-phase energization failure flag FLGV is "1" (FLGV="1", YES in step S607), the microcomputer 17 determines whether the absolute value of the V-phase peak current value (|Ivu|) is larger than or equal to the predetermined current value I0 (whether |Ivu|≥I0, step S608).

When the absolute value of the V-phase peak current value (|Ivu|) is larger than or equal to the predetermined current value I0 (|Ivu|≥I0, YES in step S608), the microcomputer 17 proceeds to step S604. On the other hand, when the absolute value of the V-phase peak current value (|Ivu|) is smaller than the predetermined current value I0 (|Ivu|<I0, NO in step S608), the microcomputer 17 determines whether the absolute value of the V-phase valley current value (|Iv1|) is larger than or equal to the predetermined current value I0 (whether |Iv1|≥I0, step S609).

When the absolute value of the V-phase valley current value (|Iv1|) is larger than or equal to the predetermined current value I0 (|Iv1|≥I0, YES in step S609), the microcomputer 17 proceeds to step S604. When the absolute value of the V-phase valley current value (|Iv1|) is smaller than the predetermined current value I0 (|Iv1|<I0, NO in step S609), the microcomputer 17 ends the process.

Furthermore, when the motor V-phase energization failure flag FLGV is not "1" (FLGV="0", NO in step S607), the microcomputer 17 determines whether the motor W-phase energization failure flag FLOW is "1" (step S610). When the motor W-phase energization failure flag FLOW is "1" (FLOW="1", YES in step S610), the microcomputer 17 determines whether the absolute value of the W-phase peak current value (|Iwu|) is larger than or equal to the predetermined current value I0 (whether |Iwu|≥I0, step S611).

When the absolute value of the W-phase peak current value (|Iwu|) is larger than or equal to the predetermined current value I0 (|Iwu|≥I0, YES in step S611), the microcomputer 17 proceeds to step S604. On the other hand, when the absolute value of the W-phase peak current value (|Iwu|) is smaller than the predetermined current value I0 (|Iwu|<I0, NO in step S611), the microcomputer 17 determines whether the absolute value of the W-phase valley current value (|Iw1|) is larger than or equal to the predetermined current value I0 (whether |Iw1|≥I0, step S612).

When the absolute value of the W-phase valley current value (|Iw1|) is larger than or equal to the predetermined current value I0 (|Iw1|≥I0, YES in step S612), the microcomputer 17 proceeds to step S604. When the absolute value of the W-phase valley current value (|Iw1|) is smaller than the predetermined current value I0 (|Iw1|<I0, NO in step S612), the microcomputer 17 ends the process.

When the motor W-phase energization failure flag FLGW is not "1" (FLGW="0", NO in step S610) or when the motor rotation angular velocity ω is higher than the predetermined motor rotation angular velocity ω1 (ω>ω1, NO in step S601), the microcomputer 17 ends the process.

Figure 13:
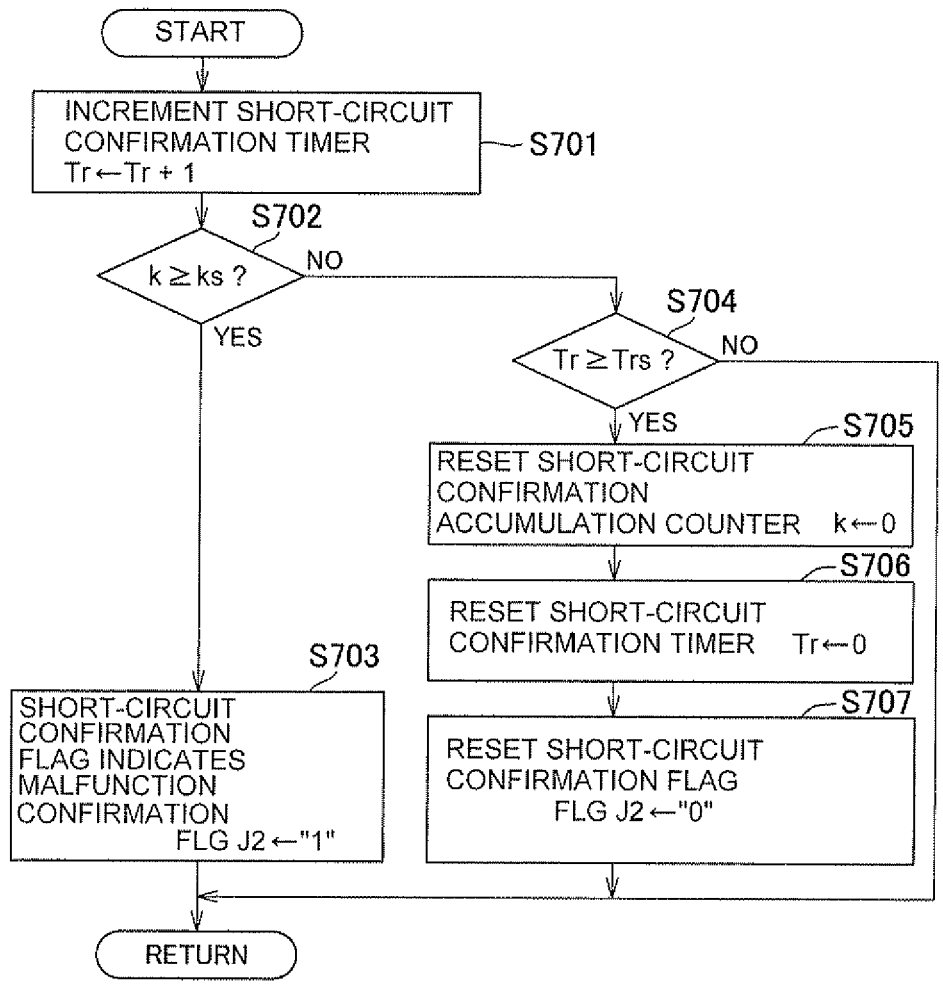
FIG. 13 is a flowchart that shows the procedure of short-circuit confirmation according to the embodiment of the invention.

Next, the procedure of short-circuit confirmation executed by the microcomputer 17 according to the present embodiment will be described with reference to the flowchart shown in FIG. 13. First, the microcomputer 17 increments the short-circuit confirmation timer Tr (Tr=Tr+1, step S701). Then, the microcomputer 17 determines whether the short-circuit confirmation accumulation counter k indicates a value larger than or equal to a predetermined value ks (whether k≥ks, step S702).

When the short-circuit confirmation accumulation counter k indicates a value larger than or equal to the predetermined value ks (k≥ks, YES in step S702), the microcomputer 17 sets the short-circuit confirmation flag FLGJ2 to "1" (step S703), and ends the process.

Subsequently, when the short-circuit confirmation accumulation counter k indicates a value smaller than the predetermined value ks (k<ks, NO in step S702), the microcomputer 17 determines whether the short-circuit confirmation timer Tr indicates a value larger than or equal to a predetermined value Trs (whether Tr≥Trs, step S704). When the short-circuit confirmation timer Tr indicates a value larger than or equal to the predetermined value Trs (Tr≥Trs, YES in step S704), the microcomputer 17 resets the short-circuit confirmation accumulation counter k (k=0, step S705).

Furthermore, the microcomputer 17 resets the short-circuit confirmation timer Tr (Tr=0, step S706). Then, the microcomputer 17 sets the short-circuit confirmation flag FLGJ2 to "0" (step S707), and ends the process. On the other hand, when the short-circuit confirmation timer Tr indicates a value smaller than the predetermined value Trs (Tr<Trs, NO in step S704), the microcomputer 17 ends the process.

According to the present embodiment, the following operations and advantageous effects are obtained.

According to the invention, while assist force is being generated using the two phases other than an energization failure phase, as energization phases, when the microcomputer 17 determines that a short-circuit between the energization failure phase and one of the other two phases occurs, the microcomputer 17 stops generation of assist force. As a result, a malfunction is reliably detected and motor lock is reliably prevented with a simple structure. Thus, it is possible to provide an electric power steering system that reliably stops the system to secure safety.

Note that, the present embodiment may be modified as follows.

In the above embodiment, the invention is applied to a column-type EPS. Alternatively, the invention may be applied to a pinion-type or rack-assist-type EPS.

In the above embodiment, the short-circuit confirmation accumulation counter and the short-circuit confirmation timer are used for short-circuit confirmation. Alternatively, without using these counter and timer, as soon as it is determined that a short-circuit between the energization failure phase and one of the other two phases occurs, generation of assist force may be immediately stopped.

In the above embodiment, the invention is applied to a column-type EPS. Alternatively, the invention may be used just for the motor control device.

What is claimed is:

1. An electric power steering system, comprising:
    a steering force assist device that applies assist force to the steering system using a three-phase brushless motor as a drive source,
    a current detecting device configured to detect an actual current that flows through the three-phase brushless motor,
    a vehicle speed detecting device configured to detect a speed of a vehicle,
    a torque detecting device configured to detect a steering torque,
    a control device configured to control an operation of the steering force assist device such that the assist force that corresponds to the steering torque is generated, and
    a malfunction determination device configured to determine occurrence of an energization failure phase when an energization failure has occurred in one of phases of the three-phase brushless motor, wherein when the energization failure phase is detected by the malfunction determination device, the control device executes control such that the assist force is generated using the two phases other than the energization failure phase as energization phases, wherein
    the malfunction determination device includes a short-circuit determination device configured to determine whether a short-circuit between the energization failure phase and one of the two phases other than the energization failure phase has occurred while the assist force is being generated using the two phases other than the energization failure phase as the energization phases; and
    the control device stops generation of the assist force every time the short-circuit determination device determines that the short-circuit between the energization failure phase and one of the other two phases has occurred.

* * * * *